United States Patent
Smyrniotis et al.

(10) Patent No.: US 9,802,154 B2
(45) Date of Patent: Oct. 31, 2017

(54) PROCESS FOR SULFUR DIOXIDE, HYDROCHLORIC ACID AND MERCURY MEDIATION

(71) Applicant: Fuel Tech, Inc., Warrenville, IL (US)

(72) Inventors: Christopher R. Smyrniotis, St. Charles, IL (US); Kent W. Schulz, Geneva, IL (US); Emelito P. Rivera, Inverness, IL (US); Ian Saratovsky, Highland Park, IL (US); Vasudeo S. Gavaskar, Naperville, IL (US)

(73) Assignee: FUEL TECH, INC., Warrenville, IL (US)

( * ) Notice: Subject to any disclaimer, the term of this patent is extended or adjusted under 35 U.S.C. 154(b) by 30 days.

(21) Appl. No.: 14/578,828

(22) Filed: Dec. 22, 2014

(65) Prior Publication Data

US 2015/0110698 A1    Apr. 23, 2015

Related U.S. Application Data

(63) Continuation-in-part of application No. 13/854,361, filed on Apr. 1, 2013, now Pat. No. 8,916,120, and a
(Continued)

(51) Int. Cl.
*B01D 53/68*    (2006.01)
*B01D 53/64*    (2006.01)
(Continued)

(52) U.S. Cl.
CPC .......... *B01D 53/68* (2013.01); *B01D 53/502* (2013.01); *B01D 53/508* (2013.01); *B01D 53/64* (2013.01);
(Continued)

(58) Field of Classification Search
CPC ...... B01D 53/50; B01D 53/502; B01D 53/64; B01D 53/40
See application file for complete search history.

(56) References Cited

U.S. PATENT DOCUMENTS 2,965,438 A    12/1960    Mullen, Jr.
3,226,992 A    12/1965    Atsukawa et al.
(Continued)

FOREIGN PATENT DOCUMENTS

JP    63001449 A    1/1988
JP    2008-531244 A    2/2006
(Continued)

OTHER PUBLICATIONS

EPA-452/R-97-010; Dec. 1997; Mercury Study, Report 5 to Congress; vol. VIII: An Evaluation of Mercury Control Technologies and Costs.
(Continued)

*Primary Examiner* — Timothy Vanoy
(74) *Attorney, Agent, or Firm* — Thaddius J. Carvis

(57) ABSTRACT

Dry processes, apparatus, compositions and systems are provided for reducing emissions of sulfur oxides, and sulfur dioxide in particular, and/or HCl and/or Hg in a process employing a combination of a lime-based sorbent, in particular hydrated lime and/or dolomitic hydrated lime, and a sorbent doping agent administered to achieve coverage of a three-dimensional cross section of a passage carrying $SO_x$ and/or HCl and/or Hg-containing gases with a short but effective residence time at a temperature effective to provide significant sulfur dioxide and/or HCl and/or Hg reductions with high rates of reaction and sorbent utilization. The once-through, dry process can advantageously introduce the sorbent and sorbent doping agent dry or preferably as a slurry to enable uniform treatment. Preferred sorbent doping agents include water-soluble or water-dispersible copper
(Continued)

and/or iron compositions which can be heated to an active form in situ by the flue gases being treated.

20 Claims, 2 Drawing Sheets

Related U.S. Application Data continuation-in-part of application No. 13/873,668, filed on Apr. 30, 2013, now Pat. No. 8,992,868.

(60) Provisional application No. 61/618,233, filed on Mar. 30, 2012, provisional application No. 61/641,055, filed on May 1, 2012.

(51) Int. Cl.
    *B01D 53/50* (2006.01)
    *B01D 53/80* (2006.01)
    *B01J 20/02* (2006.01)
    *B01J 20/28* (2006.01)
    *B01J 20/04* (2006.01)

(52) U.S. Cl.
    CPC ......... *B01D 53/685* (2013.01); *B01D 53/80* (2013.01); *B01J 20/0237* (2013.01); *B01J 20/0274* (2013.01); *B01J 20/0281* (2013.01); *B01J 20/0296* (2013.01); *B01J 20/041* (2013.01); *B01J 20/28004* (2013.01); *B01D 2251/402* (2013.01); *B01D 2251/404* (2013.01); *B01D 2251/80* (2013.01); *B01D 2253/112* (2013.01); *B01D 2253/304* (2013.01); *B01D 2257/2045* (2013.01); *B01D 2257/302* (2013.01); *B01D 2258/0283* (2013.01); *B01J 2220/42* (2013.01)

(56) References Cited

U.S. PATENT DOCUMENTS

| | | | |
|---|---|---|---|
| 3,900,504 A | | 8/1975 | Woerner |
| 3,956,458 A | | 5/1976 | Anderson |
| 4,020,180 A | | 4/1977 | Woerner |
| 4,061,716 A | * | 12/1977 | McGauley ............. C01B 17/60 252/190 |
| 4,081,253 A | * | 3/1978 | Marion ................... B01J 23/80 252/373 |
| 4,500,327 A | | 2/1985 | Nishino et al. |
| 4,609,537 A | | 9/1986 | Tolpin et al. |
| 4,724,130 A | | 2/1988 | Statnick et al. |
| 4,731,233 A | | 3/1988 | Thompson et al. |
| 4,755,499 A | | 7/1988 | Neal et al. |
| 4,795,586 A | | 1/1989 | Thompson |
| 4,923,688 A | | 5/1990 | Iannicelli |
| 5,114,898 A | | 5/1992 | Pinnavaia et al. |
| 5,492,685 A | | 2/1996 | Moran |
| 5,520,898 A | | 5/1996 | Pinnavaia et al. |
| 5,618,508 A | * | 4/1997 | Suchenwirth .......... B01D 53/34 423/240 R |
| 5,658,547 A | | 8/1997 | Michalak et al. |
| 5,740,745 A | | 4/1998 | Smyrniotis et al. |
| 5,894,806 A | | 4/1999 | Smyrniotis et al. |
| 5,897,688 A | | 4/1999 | Voogt et al. |
| 6,281,164 B1 | | 8/2001 | Demmel et al. |
| 6,453,830 B1 | | 9/2002 | Zauderer |
| 6,579,507 B2 | | 6/2003 | Pahlman et al. |
| 6,808,692 B2 | | 10/2004 | Oehr |
| 6,878,358 B2 | | 4/2005 | Vosteen et al. |
| 6,953,494 B2 | | 10/2005 | Nelson |
| 6,974,564 B2 | | 12/2005 | Biermann et al. |
| 7,435,286 B2 | | 10/2008 | Olson et al. |
| 7,666,374 B2 | | 2/2010 | Grochowski |
| 2006/0210463 A1 | | 9/2006 | Comrie |
| 2008/0127631 A1 | | 6/2008 | Haitko et al. |
| 2009/0056538 A1 | | 3/2009 | Srinivasachar et al. |
| 2010/0059428 A1 | | 3/2010 | Boren |
| 2010/0282140 A1 | | 11/2010 | Matteson et al. |
| 2010/0317509 A1 | | 12/2010 | Wang |
| 2011/0045422 A1 | | 2/2011 | Tanca |
| 2011/0079143 A1 | | 4/2011 | Marotta et al. |
| 2011/0123422 A1 | * | 5/2011 | Wang .................. B01D 53/025 423/240 S |

FOREIGN PATENT DOCUMENTS

| | | |
|---|---|---|
| WO | 9219365 A1 | 11/1992 |
| WO | 0216026 A2 | 2/2002 |
| WO | 2011143517 A1 | 11/2011 |

OTHER PUBLICATIONS

Kettner, The Removal of Sulfur Dioxide from Flue Gases, Bulletin of the World Health Organization. 32: 421-429, 1965 {retrieved on Sep. 18, 2013}.Retrieved from the internet. <URL:http://whqlibdoc.who.int/bulletin/1965/Vol32/Vo132-No3/bulletin_1965_32% 283% 29_421-429.pdf>.
Srivastava, Ravi K., Controlling SO2 Emissions: A Review of Technologies: EPA/600/R-00/0093, Nov. 2000.
CN Office Action—Application No. 201380028528.3—Action Dated Jan. 26, 2016.
AU Office Action—Application No. 2013237816—Action Dated Jul. 9, 2015.
CA Office Action—Application No. 2013237816—Action Dated Jan. 5, 2016, (2,869,124).

* cited by examiner

PROCESS FOR SULFUR DIOXIDE, HYDROCHLORIC ACID AND MERCURY MEDIATION

CROSS REFERENCE AND PRIORITY CLAIM

This application is a continuation-in-part of U.S. patent application Ser. No. 13/854,361, filed Apr. 1, 2013, and Ser. No. 13/873,668, filed Apr. 30, 2013, and claims priority to U.S. Provisional Patent Applications No. 61/618,233, filed Mar. 30, 2012, and No. 61/641,055, filed May 1, 2012, the disclosures of which are hereby incorporated herein by reference in their entireties.

FIELD OF THE INVENTION

The invention relates to dry processes, apparatus, compositions and systems for reducing emissions of sulfur oxides, and sulfur dioxide in particular, and/or HCl and/or Hg, in a process employing a highly-effective combination of a sorbent and a sorbent doping agent administered to achieve coverage of the entire cross section of a passage carrying $SO_x$ and/or HCl and/or Hg-containing gases with a short but effective residence time at a temperature effective to provide significant sulfur dioxide and/or HCl and/or Hg reductions with high rates of reaction and sorbent utilization. The invention provides a once-through, dry process and can advantageously introduce the sorbent and sorbent doping agent as a slurry to enable uniform treatment.

BACKGROUND OF THE INVENTION

The problem of sulfur oxides has challenged combustion plant operators and regulators since there became an awareness of the harmful effects of acid rain. Sulfur oxides are formed during the combustion of sulfur-containing carbonaceous fuels and are referred to generally as $SO_x$ while comprising sulfur dioxide ($SO_2$) and sulfur trioxide ($SO_3$). The vast majority of $SO_x$ is present as $SO_2$. The $SO_3$ (as $H_2SO_4$) can, however, add to particulates emitted and can cause cold end corrosion. Accordingly, an effective system must address both $SO_2$ and $SO_3$. Ideally, the process should also address the problem of hydrochloric acid (HCl) and/or mercury (Hg).

The art has provided a wide range of technologies. As a group, they can be called flue gas desulfurization technologies, FGD. See, for example, Srivastava, Ravi K.; *Controlling $SO_2$ Emissions: A Review of Technologies; EPA/600/R-00/093*, November 2000. These include both wet and dry technologies and can employ existing equipment, such as duct work, or provide separate reactors.

According to Srivastava, FGD technologies fall into two main categories: (1) once-through and (2) regenerable. In the former, the sorbent is discarded after use; and in the latter, the sorbent is regenerated after it has sorbed $SO_2$.

In once-through processes, sorbed $SO_2$ is bound by the sorbent and the sorbent is considered spent. The spent sorbents can be disposed of or recovered as a useful by-product, like gypsum, depending on quality and market factors.

Technologies considered regenerable can treat the sorbents to release the $SO_2$ and obtain useful products. After regeneration, the sorbent can be recycled for additional $SO_2$ scrubbing.

Each of the once-through and regenerable technologies can be further broken down as wet or dry. Wet processes produce a wet slurry waste or by-product, and scrubbed flue gas is saturated with water. The dry processes produce dry waste material, and scrubbed flue gas is not saturated.

The reader is referred to Srivastava, supra, for a closer view of the various technologies, where the authors group major FGD technologies into three major categories: (1) Wet FGD (composed of once-through wet FGD), (2) Dry FGD (composed of once-through dry FGD) and (3) Regenerable FGD (composed of wet and dry regenerable FGD)

The wet FGD processes can employ wet scrubbers, which typically employ large towers that cause contact between combustion flue gases and a slurry of calcium carbonate or the like that is sprayed countercurrently to the flue gas flow. Suitable chemical slurries can include calcium carbonate (limestone), lime (CaO in slurry as Ca(OH)$_2$), trona (sodium sesquicarbonate), sodium bicarbonate, dolomite, and the like, or blends of these materials. In limestone-based scrubbers, the $SO_x$ is captured to form $CaSO_3$, which is naturally oxidized in part or overtly oxidized to form gypsum ($CaSO_4$), which can be used commercially. Reaction between the $SO_x$ and the sorbent occurs in the liquid phase in a stirred tank over considerable time periods. Fuels high in chlorides will alter the chemical equilibrium in the liquid and can adversely affect scrubber efficiency. Quality and market conditions will dictate the value and fate of the spent sorbent. These wet scrubbers are expensive to install and operate and cannot be easily adapted to all plants.

The dry processes can introduce these same type of chemicals, either dry or as slurries that rapidly dry, into a flue gas stream in the furnace, a separate reactor or a duct or other passage carrying the flue gas, wherein the $SO_x$ is captured to some extent and can be disposed of in dry particulate form.

In one group of dry processes, a slurry is sprayed into a separate reactor—adapted from industrial spray driers—to cause intimate contact with the flue gases for moderate reaction times, e.g., ten seconds or more. These processes are quite effective, while not as effective as the wet scrubbers. They, however, are also capital intensive but cannot provide the high quality gypsum achievable by wet scrubbers.

In in-furnace sorbent injection, a dry sorbent is injected directly into the furnace in the optimum temperature region above the flame. As a result of the high temperature (e.g., on the order of 2000° F.), sorbent particles (e.g., often calcium hydroxide or calcium carbonate) decompose and become porous solids with high surface systems. Residence time is very short, on the order of a few seconds, and the sorbent particles are easily fouled before the chemical is fully utilized.

In-duct sorbent injection, like in-furnace sorbent injection, involves direct injection of sorbent into $SO_x$-containing gases. In these processes, the sorbent is introduced into a flue gas duct, but in contrast to spray drying, contact is made without the advantage of a large reaction vessel as used in spray dryers, and suffers from greatly diminished contact times, e.g., often only a few seconds. In-duct injection, typically uses an alkali metal or alkaline earth oxide or hydroxide, like trona, sodium carbonate, calcium hydroxide, magnesium hydroxide, dolomite, or the like, as outlined by Srivastava, supra, and U.S. Pat. No. 5,658,547 to Michalak, et al. U.S. Pat. No. 5,492,685 to Moran describes a hydrated lime having high surface area and small particle size prepared by hydrating lime with an aqueous hydration solution of an organic solvent, and preferably washing the resulting hydrate with an aqueous solution of an organic solvent prior to drying. The high surface area hydrates (e.g., up to 85 m$^2$/g) are sorbents for $SO_2$ removal from gas streams.

U.S. Pat. No. 5,658,547 to Michalak, et al., describes removing $SO_x$ and particulates from the combustion gases of a large boiler. In a primary treatment zone, a slurry comprising an alkaline $SO_x$-reducing composition and preferably a nitrogen-containing composition effective to reduce $NO_x$, is introduced into combustion gases at a temperature of from about 900° to about 1300° C. (about 165° to about 2375° F.). The gases are cooled by initial contact with steam-generating means, and then by contact with a gas-to-gas heat exchanger. Cooled gases are then subjected to a secondary treatment in which they are first humidified and further cooled by introduction of a water spray or aerosol to reduce the temperature to 100° C. (212° F.) or below. Contact between the $SO_x$-reducing composition and the humidified gas is maintained for a reaction period of at least two seconds. Particulate solids are then separated from the gases with a fabric filter. The cleaned gases are reheated by the gas-to-gas heat exchanger prior to discharge to the atmosphere.

These processes require feeding large quantities of these $SO_x$-reducing reagents, whether to the furnace or to back end duct work, and add significant solids to ash capture equipment and in some cases can degrade performance and cause operating and handling problems under certain conditions. There remains a need for a dry scrubbing process that can increase the sorbent utilization and removal efficiencies.

Other dry processes can include fluidized beds that provide longer reaction times. These processes are typically engineered to recirculate the sorbent for multiple passes with the combustion gases to enhance economy by increasing utilization of the sorbent. The sorbents for these processes are intended for recycling and are, therefore, more expensive to make and handle.

An example of these latter types of processes is seen from U.S. Pat. No. 4,755,499 to Neal, et al., which describes sorbents that are intended to be resistant to normal physical degradation which results from recurring adsorption and regeneration for use in a fluidized bed absorber. The sorbent is constructed of (a) an alumina substrate having a specified pore volume and (b) an alkali or alkaline earth component in defined amount relative to the substrate. Minor amounts of other metallic oxides can also be employed. The sorbents are manufactured to be regenerable and attrition resistant. They can be regenerated by heating in an inert atmosphere at temperatures up to about 350° C. and then reused.

In a related disclosure, U.S. Pat. No. 6,281,164, Demmel, et al., teach that the useful life of $SO_x$ additives having a $SO_2$ to $SO_3$ oxidation catalyst component and a $SO_3$ absorption component can be extended by employing each of these components as separate and distinct physical particles or pellets. The particles are prepared by spray drying or desiccation followed by calcination to produce microspheroidal particles having a range of sizes such that essentially all such particles will be retained by a Standard U.S. 200 mesh screen and essentially all particles will be passed by a Standard U.S. 60 mesh screen. Processing to reduce $SO_x$ entails capturing the $SO_x$ on the particles and then regenerating the particles for reuse. These particles are too expensive for once-through processes and are, in fact, too large to achieve good utilization in those processes.

Another example of regenerable sorbents is found in U.S. Pat. No. 5,114,898 to Pinnavaia, et al., which describes processes for removing noxious sulfur oxides from gas streams, particularly from flue gases of coal-burning power plants, using heated layered double hydroxide (LDH) sorbents. The sorbent compositions contain metal components, incorporated into the sorbents either by isomorphous replacement of all or part of $M^{11}$ and/or $M^{111}$ ions (the patent defining $M^{11}$ as a divalent metal and $M^{111}$ as a trivalent metal) in layers of LDH structures or by impregnation as a metal salt, to promote the oxidation of sulfur dioxide.

In another related teaching, U.S. Pat. No. 5,520,898 to Pinnavaia, et al., describes the use of base/clay composite materials as sorbents for the removal of $SO_x$ from flue gas streams. The composite contains a smectite clay and a sorbent component, such as alkaline earth metal hydroxides and carbonates, and a metal oxide or metal oxide precursor, preferably selected from transition metal ions. The smectite-type clays are said to serve as supports for the reactive base and as a dispersing agent for improved reactivities. The swelling properties of smectite clays are said to be responsible for higher reactivity of the sorbents. The injection of the sorbents into these, particularly to the boiler (700°-1000° C.), along with coal was considered.

There is a present need for technology that can improve on the capture of $SO_2$ and/or HCl and/or Hg in high percentages and in an economical manner in terms of material, equipment and disposal.

SUMMARY OF THE INVENTION

The present invention provides processes, apparatus, compositions and systems that will have a very positive effect on air quality by enabling reduction of $SO_x$ and/or HCl and/or Hg emissions at a very reasonable cost. The invention can be employed as a retrofit solution to existing plants and can be used in design of new plants.

In one aspect, the invention provides a process for reducing emissions of $SO_x$ and/or HCl and/or Hg from a combustor, comprising: identifying locations within a combustor for feeding a lime-based sorbent, particularly hydrated lime, dolomitic hydrated lime and mixtures of these, and a sorbent doping agent; determining the physical form and injection parameters for the sorbent and the sorbent doping agent; injecting both the sorbent and the sorbent doping agent into combustion gases containing $SO_x$ and/or HCl and/or Hg, the introduction being under conditions effective to capture sulfur oxides and/or HCl and/or Hg with the sorbent at a greater rate than achievable by the same sorbent without the sorbent doping agent; and collecting the spent sorbent.

In embodiments, the lime-based sorbent can be reduce or omitted, especially where the objective is to reduce HCl and/or Hg.

In some embodiments the sorbent doping agents will comprise at least one member selected from the group of compositions comprising the sorbent doping agent comprises a copper composition selected from the group consisting of copper ammonium acetate, copper diammonium diacetate, copper ammonium triacetate, copper triammonium acetate, copper tetra ammonium sulfate, copper gluconate (and hydrates thereof), and mixtures of any of these. From another perspective, the doping agent can be a member selected from the group consisting of compositions defined by the formula $Cu(NH_3)_x(\text{lower carboxylate})_y$, wherein the lower carboxylate is selected from the group consisting of formate, acetate and propionate, x is an integer from 0 to 4, y is an integer from 0 to 2, and x+y is equal to or greater than 1.

In embodiments of the invention, the doping agents will comprise the sorbent doping agent comprises an aqueous cuprammonium lower carboxylate complex of copper lower carboxylate and ammonium lower carboxylate.

In embodiments the doping agents will comprise an aqueous cuprammonium lower carboxylate complex of copper lower carboxylate and ammonium lower carboxylate containing weight proportions of about 13 parts of copper lower carboxylate as measured as the dihydrate to about 2 parts of ammonium lower carboxylate, and about 10 parts of 29 percent aqueous ammonia, said solution being at a pH in the range of about 7.1 to 7.4.

In embodiments the lime-based sorbent and the sorbent doping agent are injected by injection means comprising a plurality of nozzles within an introduction zone, and the nozzles are positioned to achieve at least 90% coverage within the introduction zone.

In another aspect, the invention provides an apparatus for reducing $SO_x$ and/or HCl and/or Hg in a gas stream, comprising: injection means positioned at locations on a passage for flue gases generated by the combustion of fuel, said injection means capable of feeding a lime-based sorbent, particularly hydrated lime, dolomitic hydrated lime and mixtures of these, and a sorbent doping agent at predetermined rates relative to a concentration of $SO_x$ and/or HCl and/or Hg in said flue gases, and said injection means further capable of introducing the sorbent and a sorbent doping agent in a predetermined physical form and with predetermined injection parameters for the sorbent and the sorbent doping agent including droplet size, momentum and concentration; whereby the sorbent with the sorbent doping agent captures sulfur oxides with high efficiency.

In another aspect, the invention provides system for reducing $SO_x$ and/or HCl and/or Hg in a gas stream, comprising: computer modeling means for identifying locations within a combustor and its duct work for feeding a lime-based sorbent, particularly hydrated lime, dolomitic hydrated lime and mixtures of these, and a sorbent doping agent and determining the physical form and injection parameters for the sorbent and the sorbent doping agent injection means positioned at locations on a passage for flue gases, said injection means capable of feeding the sorbent and sorbent doping agent at predetermined rates relative to a measured concentration of $SO_x$ and/or HCl and/or Hg in said passage, and said injection means further capable of introducing the sorbent and a sorbent doping agent in a predetermined physical form and with predetermined injection parameters for the sorbent and the sorbent doping agent including droplet size, momentum and concentration; whereby the sorbent with the sorbent doping agent can have the characteristics specified below to capture sulfur oxides and/or HCl and/or Hg with high efficiency.

In yet another aspect, the invention provides compositions for reducing $SO_x$ and/or HCl and/or Hg in a gas stream, comprising: a lime-based sorbent, in particular hydrated lime and/or dolomitic hydrated lime, and a sorbent doping agent comprising copper and/or iron which will dehydrate and be caused to shatter into fine particles within the size range of from about 0.01 to about 0.2 microns upon introduction into a hot gas stream containing $SO_x$ and/or HCl and/or Hg, wherein the weight ratio (dry basis) of sorbent to sorbent doping agent is within the range of from about 100:1 to about 1:1 and the sorbent doping agent is selected from water-soluble or water-dispersible copper and/or iron compositions that release active copper or iron species when heated in situ by the flue gases being treated.

The invention provides several advantages compared with competitive processes, prominent among which are: treating flue gases to reduce $SO_x$ and/or HCl and/or Hg; sorbent material usage can be reduced due to sorbent utilization being more efficient; very high sulfur removal rates are enabled; simple equipment can be employed for retrofit.

Other preferred aspects and their advantages are set out in the description which follows.

BRIEF DESCRIPTION OF THE DRAWINGS

The invention will be better understood and its advantages will become more apparent when the following detailed description is read in conjunction with the accompanying drawings, in which.

DETAILED DESCRIPTION OF THE INVENTION

Figure 1:
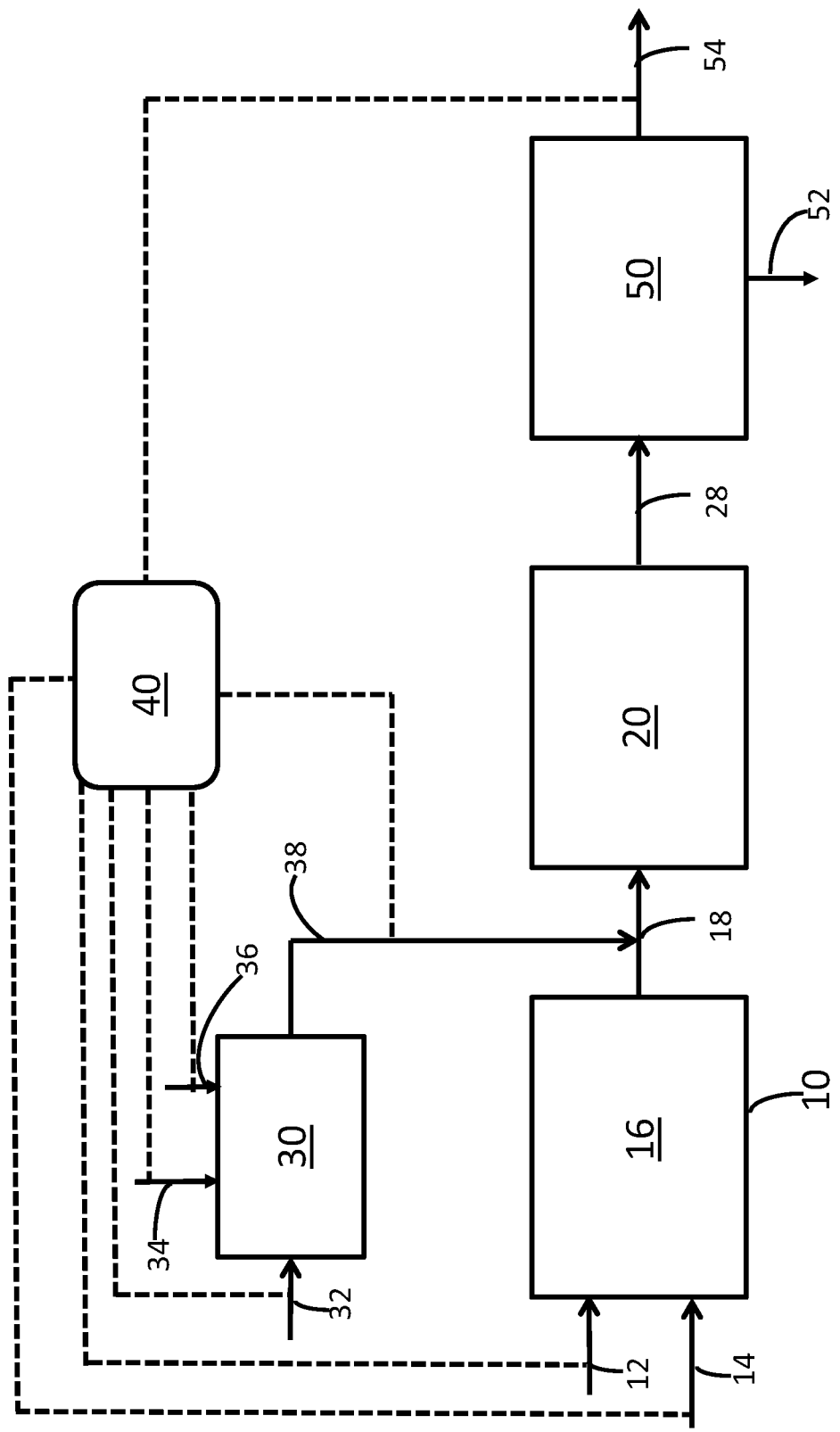
FIG. 1 is a flow diagram of one embodiment of the invention.

Reference will first be made to FIG. 1, which is a flow diagram of one embodiment of the invention. A combustor 10 can be of the type used for producing steam for electrical power generation, process steam, heating or incineration. It will be understood that other types of combustors can be employed to utilize the advantages of the invention. Unless otherwise indicated, all parts and percentages in this description are based on the weight of the materials at the particular point in processing or dry where that is indicated.

Coal is fed to the combustor 10 via line 12 and burned with air from line 14 in a combustion zone 16. It is an advantage of the invention that coal that is high in sulfur can be combusted with the resulting sulfur dioxides reduced. Advantageously, HCl and/or Hg can be reduced also or in place of $SO_x$ reduction, as needed or desired. It will be understood that the principles of the invention can be applied to other carbonaceous fuels and fuel mixtures (any other fuel of choice, typically a carbonaceous thermal fuel or refuse).

Air for combustion, supplied by line 14, is preferably preheated by gas-to-gas heat exchangers (not shown) which transfer heat from ductwork (not shown) at the exit end of the combustion equipment, e.g., downstream of heat exchange section 20, where useful thermal energy is recovered from the combustor. Hot combustion gases flow through the combustor as indicated by arrow 18 and flow through heat exchanger section 20, which transfers heat from the combustion gases to water or steam for the generation of steam or super-heated steam. Other heat exchangers, including an economizer (downstream and not shown) may also be provided according to the design of the particular boiler.

It has been determined that many of the sorbent materials identified above and long associated in the art as effective for $SO_x$ reduction are far surpassed by a narrow group of combinations of sorbent and sorbent doping agents. The invention identifies lime-based sorbents, prominently including hydrated lime (also called hydrate and calcium hydroxide) and/or dolomitic hydrated lime (also called hydrated dolomite and dolomite hydrate) including mixtures of these, of fine particle size and high surface area as a highly-effective sorbent, especially when employed with a sorbent doping agent comprising a copper and/or iron composition.

The sorbent doping agent is employed as a water-soluble or water-dispersible composition of copper and/or iron (e.g., as a salt of copper and/or iron that can form the copper or iron oxide by heating in situ) that can be added to the sorbent for introduction into the flue gas to be treated. These sorbent doping agents release an active form, i.e., species, believed to be the oxides of copper and/or iron, in situ when heated by the flue gases being treated. The sorbent doping agent is typically employed (dry basis) at a rate of from about 1 to about 10 pounds per ton of fuel, with a narrower range being from about 2 to about 6 pounds per ton.

The sorbent doping agent will typically be employed with the sorbent at a weight ratio (dry basis) of sorbent to sorbent doping agent within the range of from about 100:1 to about 1:1. More preferred ratios will be within the range of from about 50:1 to about 5:2. Among the sorbent doping agents are iron salts such as iron nitrate and copper salts such as copper nitrate, those listed below, and especially those compositions described in U.S. Pat. No. 3,900,504 and U.S. Pat. No. 4,020,180 to Woerner, the disclosures of which are specifically incorporated herein by reference in their entireties.

In embodiments, sorbent doping agents can be water-soluble or water-dispersible copper and/or iron compositions which are believed to form copper and/or iron oxides when heated in situ by the flue gases being treated. Specifically referenced compositions are those described in U.S. Pat. No. 4,020,180 as comprising an aqueous cuprammonium lower carboxylate complex of copper lower carboxylate and ammonium lower carboxylate. Desirably in accord with U.S. Pat. No. 4,020,180, the complex will contain weight proportions of about 13 parts of copper lower carboxylate as measured as the dihydrate to about 2 parts of ammonium lower carboxylate, and about 10 parts of 29 percent aqueous ammonia, said solution being at a pH in the range of about 7.1 to 7.4.

In embodiments, doping agents according to the invention are highly soluble or dispersible in water and react with the hot combustion gases to result in compositions chemically different from when contacted with the combustion gases. Desirably, doping agent compositions include copper compositions that have copper that can be released in an active form at the temperatures involved to form a reactive copper entity. While it is theorized that the copper is oxidized to copper oxide, CuO, applicants do not want to be bound by a particular theoretical reaction. It appears that water-insoluble copper compounds are formed in predominance to water-soluble copper compounds.

Among the doping agents of interest to the invention are compositions that comprise copper and an ammonia moiety. Among these are ammonium copper compositions, including those having one or more copper atoms with one or more ammonium moieties. Water solubility or dispersibility is important because introducing them with water has been shown to be a highly-effective manner of achieving the necessary distribution followed by dissociation. Chemical dispersants and agitation can be employed as necessary.

In embodiments of the invention, the sorbent doping agents will comprise a copper composition selected from the group consisting of copper ammonium acetate, copper diammonium diacetate, copper ammonium triacetate, copper triammonium acetate, copper tetra ammonium sulfate, copper gluconate (and hydrates thereof), and mixtures of any of these. From another perspective, the doping agent can be a member selected from the group consisting of compositions defined by the formula $Cu(NH_3)_x(lower\ carboxylate)_y$, wherein the lower carboxylate is selected from the group consisting of formate, acetate and propionate, x is an integer from 0 to 4, y is an integer from 0 to 2, and x+y is equal to or greater than 1.

Closely related compositions and their hydrates as well other copper sources that exhibit similar efficacies in reacting with $SO_2$ and/or HCl and/or Hg can be employed. Copper compositions that contain no ammonium moiety, can be employed, but it is believed that these compositions will be facilitated in effectiveness by the presence of ammonia, such as a result of processing (e.g., for $NO_N$ reduction) or by supplementation as needed with ammonia or urea or other material effective to produce ammonia at the temperatures involved, as well as compounds equivalent in effect, e.g., ammines and their salts, urea breakdown products, ammonium salts of organic and inorganic acids, ammonium carbamate, biuret, ammelide, ammeline, ammonium cyanate, ammonium carbonate, ammonium bicarbonate; ammonium carbamate; triuret, cyanuric acid; isocyanic acid; urea formaldehyde; melamine; tricyanourea and mixtures and equivalents of any number of these.

Among copper containing doping agents not containing an ammonium moiety are copper acetylacetonate (and hydrates thereof), copper citrate (and hydrates thereof, e.g., hemipentahydrate), copper formate (and hydrates thereof), copper acetate monohydrate, copper nitrate (and hydrates thereof), copper 2,4-pentandionate (and hydrates thereof), copper sulfate (and hydrates thereof), copper gluconate (and hydrates thereof), copper soaps of fatty acids, and mixtures of any of these.

The lime-based sorbent will dehydrate and be caused to shatter in situ by the flue gases being treated and comprised of a hot gas stream containing $SO_x$, into fine particles within the size range of from about 0.01 to about 0.2 microns and containing the copper and/or iron oxides well dispersed therein.

Typically, the lime-based sorbent will be contacted with the hot flue gases containing $SO_x$ as a slurry with the sorbent doping agent, and the composition will dehydrate and be caused to shatter into fine particles (e.g., within the size range of from about 0.01 to about 0.2 microns) which based on modeling and proper placement of injectors and adjustment of droplet size, momentum and concentration prior to introduction, are dispersed over the cross section of the furnace section, duct or other apparatus where the flue gas is flowing. The dolomite hydrate can also be employed dry where this permits uniform distribution across the flow path of the flue gases being treated.

Preferred conditions will call for introducing the sorbent and doping agent using modeling techniques, such as computational fluid dynamics, which can be employed to initially determine the optimum locations (zones) to direct treatment chemicals within the boiler and/or ducts. Desirably, best sorbent and doping agent introduction will achieve essentially full coverage of the sorbent and doping agent across a three-dimensional section of a passage for the gases to be treated. Preferably, a number of nozzles will be spaced within the zones to achieve at least 90% coverage at the temperature necessary for reaction. This section can have a depth in the direction of flow as necessary to assure complete coverage from the sorbent and doping agent injectors used. In other words, the zone will preferably be of a depth in the direction of flow sufficient that each of the conical or like spray patterns from nozzles used to introduce the sorbent and doping agent will overlap with at least one other spray pattern, thereby providing sorbent and doping agent across the entire cross section of the zone. This three-dimensional section for treatment can be referred to as a defined introduction zone, and the aqueous sorbent and doping agent will be introduced into this zone under conditions effective for HCl and/or $SO_x$ and/or Hg emissions control. Following this zone (i.e., downstream of it) the combustion gases now having been treated with the sorbent and doping agent are discharged following sufficient reaction time to reduce the HCl and/or $SO_x$ and/or Hg concentration in the gases.

The lime-based sorbents, which have been found effective according to the invention for capturing $SO_x$ and/or HCl and/or Hg, can be employed as hydrated lime and/or dolomitic hydrated lime, preferably mixed with water to form a slurry with or without chemical stabilizers, to concentrations suitable for storage and handling, e.g., at least about 25%, and preferably at least about 40%, solids by weight. Preferred concentrations are within the range of from about 30 to about 50 weight %, e.g., from about 35 to about 45 weight %, based on the dry weight of the sorbent. The sorbent doping agent can be blended with the sorbent at any practical point prior to introduction into the hot combustion gases. In some cases it is introduced into the slurry tank or injection equipment directly before introduction into the flue gas being treated.

Figure 2:
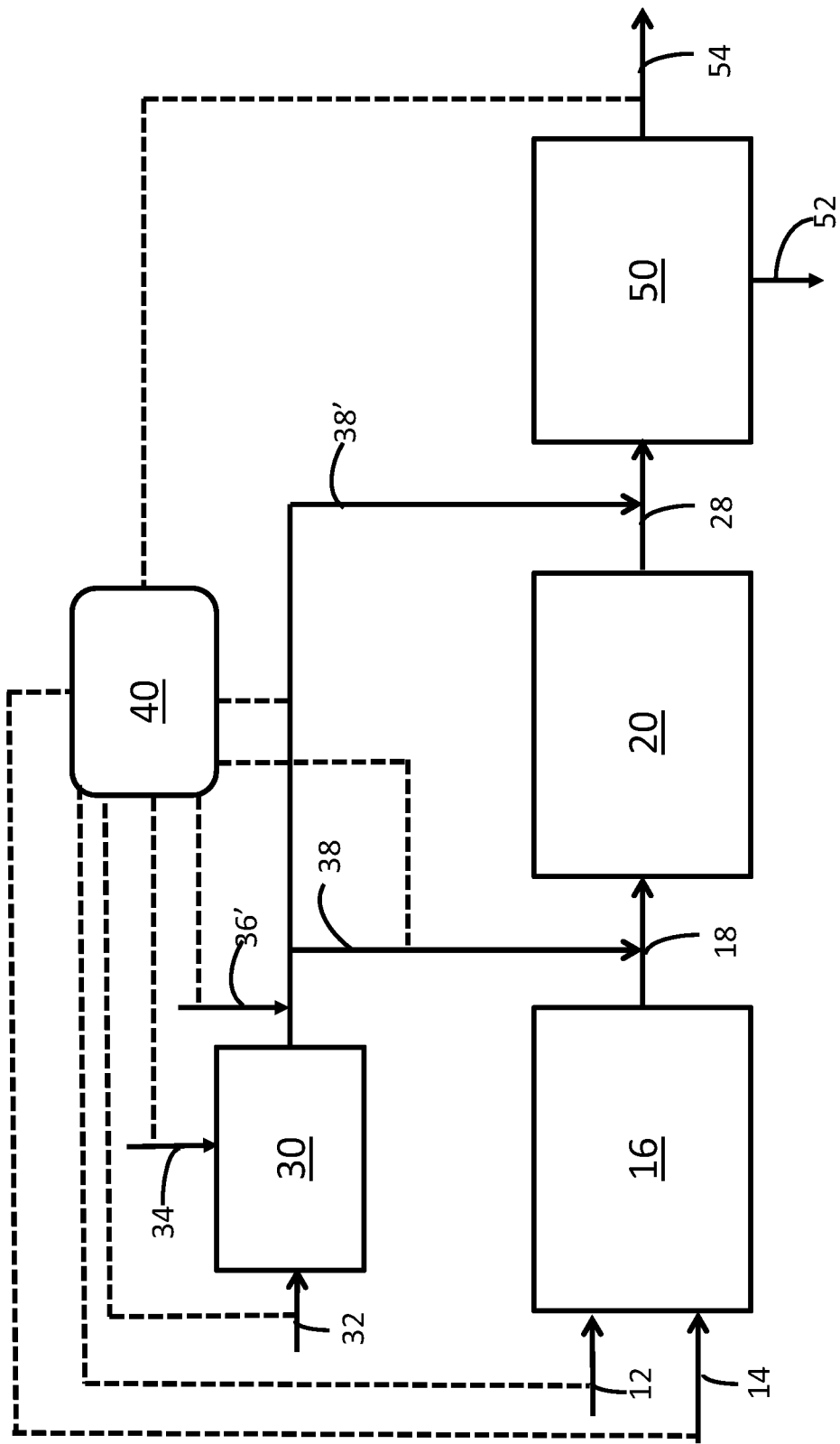
FIG. 2 is a flow diagram of another embodiment of the invention.

Reference is made to FIG. 1, which depicts a mixing stage 30 provided to prepare hydrated lime and/or dolomitic hydrated lime sorbent slurry, preferably in a form having high surface area, e.g., above about 100, e.g., 13 $m^2$/gram (BET). For example, sorbent can be supplied via line 32, water can be supplied via line 34 and sorbent doping agent can be supplied via line 36. The sorbent slurry is typically characterized as containing from about 25 to about 45% solids by weight in water. Suitable stabilizers can be used to avoid the need for constantly stirring the tanks, but stirring is preferably provided. The material is further characterized by having a mass average particle size of from about 1 to about 5 microns (p), e.g., nominally about 2 to 4 microns. An alternative scheme is shown in FIG. 2 wherein the sorbent doping agent can be added through 36' to a slurry of sorbent in line 38 and mixed by suitable means in the line. In all cases, the relative amounts of the materials and water can be controlled by a suitable controller 40; or batching and feed can be adjusted manually. Dotted lines in the drawings schematically designate control lines for proper communication between the various controlled lines and valves and the controller 40.

Preferred conditions will call for introducing the lime-based sorbent as a slurry incorporating the sorbent doping agent into a flue gas being treated. The flue gas will typically be at a temperature below about 2200° F. where treated, and will typically be within the range of from about 2100° to about 1500° F., preferably from about 1900° F. to about 1600° F. For HCl reduction, these temperatures are effective as are temperatures below 1600° F., e.g., typically lower than 900° F., say of from about 350° F. to about 700° F. that will also be effective. The slurry will typically be introduced as fine droplets having a mean diameter of from about 10 to about 350 microns, e.g., from about 50 to about 200 microns, so that the sorbent will be present for contact with the gas as fine particles of lime-based sorbent, e.g., hydrated lime and/or dolomitic hydrated lime, intimately mixed with the sorbent doping agent. Upon contact with the flue gas, the slurry will dry and, it is believed, will shatter to form ultrafine particles having a particle size of from about 0.01 to about 0.2 microns, e.g., about 0.02 to about 0.1 microns.

The feed rate of the lime-based sorbent can be established at any rate calculated to effectively reduce the concentration of $SO_x$ in the flue gas and will depend on the amount of fuel and its sulfur content. For coal having about 0.2 to about 3% sulfur, a feed rate of about 50 pounds of sorbent per ton of fuel will be an adequate starting point, with the exact feed rate to be determined based on experimentation. Typical feed rates will be within the range of from about 10 to about 100 pounds of lime-based sorbent (dry) per ton of fuel, and preferred rates will be within the range of from about 20 to about 90 pounds, e.g., 30 to about 70 pounds, of hydrated lime and/or dolomitic hydrated lime per ton of fuel. The sorbent will typically be employed at a weight ratio of sorbent to $SO_2$ in the flue gases of from about 0.15:1 to about 1.4:1. Preferred rates will be within the range of from about 0.45:1 to about 1.2:1.

It is an advantage of the present invention that essentially complete coverage of the sorbent and doping agent is achieved in the combustion gases in an introduction zone at the temperature necessary for reaction. This section can have a depth in the direction of flow as necessary to assure complete coverage from the sorbent injectors used and will depend on the spray pattern of the injectors and the velocity of the gases. In one variation of the invention, the sorbent and the sorbent doping agent are introduced through separate injectors in proximity or in tandem such that the spray patterns of each pair of injectors (and there may be many across the section) overlap to at least some extent. Desirably, the invention will achieve full effect by modeling, e.g., by mechanical modeling or computational fluid dynamics using computer and data input means to identify locations within a combustor for feeding a lime-based sorbent and a sorbent doping agent and determine the physical form and injection parameters for the sorbent and the sorbent doping agent injection means positioned at locations, e.g., into line 18 in FIGS. 1 and 2, on a passage for flue gases from a combustor. Note that FIG. 2 shows additional or alternative introduction of slurry into line 28 via line 38' following heat exchange section 20, where the temperature will be lower, e.g., less than 900° F., e.g., within the range of from about 700° to about 200° F.

The invention will employ suitable injection means, such as nozzles (not shown) of the internal mix or external mix type, which can be (but don't have to be) air atomized and are capable of feeding a lime-based sorbent and a sorbent doping agent at a predetermined rate relative to a measured concentration of $SO_x$ in said passage. Internal mix nozzles capable of extremely fine droplet production are preferred. The injection means should be further capable of introducing the sorbent and a sorbent doping agent in a predetermined physical form and with predetermined injection parameters for the sorbent and the sorbent doping agent including droplet size, momentum and concentration.

Preferably, air-assisted atomizing nozzles are provided for introducing sorbent and sorbent doping agent into combustion gases prior to or flowing through heat exchanger section 20. The locations for the nozzles are preferably determined by computational fluid dynamics, by methodologies taught for example in U.S. Pat. No. 5,740,745 and U.S. Pat. No. 5,894,806, which are hereby incorporated by reference. The concentration and flow rates will be initially determined by modeling to assure that the proper amount of chemical is supplied to the correct location in the combustor in the correct physical form to achieve the desired results of reduced 502 and/or HCl.

Following introduction of the sorbent and sorbent doping agent, the gases are passed through particulate recovery means 50, which can include one or more of fabric filters and/or electrostatic precipitators. It is an advantage of the invention that because the combination of and sorbent doping agent is so effective at removing $SO_x$, after contact times of less than 3 seconds, that the added reaction time provided by a fabric filter is not essential as it is to lesser active sorbent treatments of the prior art. Solids can be recovered via line 52, and flue gas can be exhausted via line 54.

The above description is for the purpose of teaching the person of ordinary skill in the art how to practice the invention. It is not intended to detail all of those obvious modifications and variations, which will become apparent to the skilled worker upon reading the description. It is intended, however, that all such obvious modifications and variations be included within the scope of the invention which is defined by the following claims. The claims are meant to cover the claimed components and steps in any sequence that is effective to meet the objectives there intended, unless the context specifically indicates the contrary.

The invention claimed is:

1. A process for reducing emissions of $SO_x$ and/or HCl and/or Hg from a combustor, comprising: identifying locations within a combustor for feeding lime-based sorbent comprising at least one composition selected from the group consisting of hydrated lime and dolomitic hydrated lime, and a sorbent doping agent comprising a water-soluble or water-dispersible composition of copper; determining the physical form and injection parameters for the sorbent and the sorbent doping agent; injecting both the sorbent and the sorbent doping agent with water into combustion gases containing $SO_x$ and/or HCl and/or Hg, the introduction being under conditions effective to capture sulfur oxides and/or HCl and/or Hg with the sorbent at a greater rate than achievable by the same sorbent without the sorbent doping agent; and collecting the spent sorbent.

2. A process according to claim 1, wherein the sorbent is introduced at a temperature within the range of from about 2200° to 1500° F. as a slurry in droplets having a mean diameter of from about 25 to about 300 microns.

3. A process according to claim 2, wherein the sorbent is introduced at a temperature within the range of from 1900° to about 1600° F.

4. A process according to claim 1, wherein the sorbent is introduced to reduce HCl at a temperature of less than about 1600° F.

5. A process according to claim 1, wherein the sorbent is introduced to reduce HCl at a temperature lower than 900° F.

6. A process according to claim 1, wherein the sorbent is introduced a as droplets having a mean diameter of from about 25 to about 350 microns.

7. A process according to claim 1, wherein the sorbent is introduced at feed rates within the range of from about 25 to about 100 pounds of hydrated lime and/or dolomitic hydrated lime per ton of fuel.

8. A process according to claim 1, wherein the dolomite hydrate is employed at a weight ratio of hydrated lime and/or dolomite hydrate to weight of $SO_2$ in the flue gases of from about 0.15:1 to about 1.4:1.

9. A process according to claim 1, wherein the sorbent doping agent will be employed with the hydrated lime and/or dolomite hydrate sorbent at a weight ratio (dry basis) of dolomite hydrate to sorbent doping agent within the range of from about 100:1 to about 1:1.

10. A process according to claim 1, wherein the sorbent doping agent comprises a copper composition selected from the group consisting of copper ammonium acetate, copper diammonium diacetate, copper ammonium triacetate, copper triammonium acetate, copper tetra ammonium sulfate, copper gluconate (and hydrates thereof), and mixtures of any of these.

11. A process according to claim 1 wherein the sorbent doping agent comprises an aqueous cuprammonium lower carboxylate complex of copper lower carboxylate and ammonium lower carboxylate.

12. A process according to claim 1, wherein the sorbent doping agent comprises an aqueous cuprammonium lower carboxylate complex of copper lower carboxylate and ammonium lower carboxylate containing weight proportions of about 13 parts of copper lower carboxylate as measured as the dihydrate to about 2 parts of ammonium lower carboxylate, and about 10 parts of 29 percent aqueous ammonia, said solution being at a pH in the range of about 7.1 to 7.4.

13. A process according to claim 1, wherein the sorbent doping agent comprises a member selected from the group consisting of: copper acetylacetonate (and hydrates thereof), copper citrate (and hydrates thereof), copper formate (and hydrates thereof), copper acetate monohydrate, copper nitrate (and hydrates thereof), copper 2,4-pentandionate (and hydrates thereof), copper sulfate (and hydrates thereof), copper gluconate (and hydrates thereof), copper soaps of fatty acids, and mixtures of any of these.

14. A process according to claim 1, wherein the sorbent doping agent comprises copper diammonium diacetate.

15. A process according to claim 1, wherein the sorbent doping agent comprises a copper ammonium complex having an empirical formula of $C_2H_7CuNO_2$.

16. A process according to claim 1, wherein the sorbent is injected as a slurry containing from about 25 to about 45% hydrated lime and/or dolomitic hydrated lime solids by weight in water.

17. A process according to claim 1, wherein the sorbent has a mass average particle size of from about 1 to about 10 microns (μm).

18. A process according to claim 1, wherein the hydrated lime and/or dolomite hydrate sorbent is mixed with water to form a slurry at a concentration of at least about 25% solids by weight.

19. A process according to claim 1, wherein the hydrated lime and/or dolomitic hydrated lime sorbent and the sorbent doping agent are injected by injection means comprising a plurality of nozzles within an introduction zone, and the nozzles are positioned to achieve at least 90% coverage within the introduction zone.

20. A process according to claim 1, wherein the doping agent can be a member selected from the group consisting of compositions defined by the formula $Cu(NH3)_x(lower\ carboxylate)_y$, wherein the lower carboxylate is selected from the group consisting of formate, acetate and propionate, x is an integer from 0 to 4, y is an integer from 0 to 2, and x+y is equal to or greater than 1.

* * * * *